United States Patent
Taylor

(10) Patent No.: US 9,148,762 B2
(45) Date of Patent: Sep. 29, 2015

(54) SAFECELL 360™ WIRELESS POLICY ENFORCEMENT MANAGEMENT (WPEM) SOLUTION

(71) Applicant: W2W, LLC, Houston, TX (US)

(72) Inventor: W. Scott Taylor, Houston, TX (US)

(73) Assignee: W2W, LLC, Houston, TX (US)

( * ) Notice: Subject to any disclaimer, the term of this patent is extended or adjusted under 35 U.S.C. 154(b) by 0 days.

(21) Appl. No.: 14/274,429

(22) Filed: May 9, 2014

(65) Prior Publication Data
US 2014/0342725 A1 Nov. 20, 2014

Related U.S. Application Data

(60) Provisional application No. 61/821,562, filed on May 9, 2013.

(51) Int. Cl.
*H04M 3/00* (2006.01)
*H04W 4/02* (2009.01)
*H04W 4/04* (2009.01)

(52) U.S. Cl.
CPC .............. *H04W 4/027* (2013.01); *H04W 4/028* (2013.01); *H04W 4/046* (2013.01)

(58) Field of Classification Search
CPC .. H04W 8/245; H04W 8/265; H04M 1/72525
USPC ................. 455/419, 418, 456.1, 414.1, 432.1
See application file for complete search history.

(56) References Cited

U.S. PATENT DOCUMENTS

| | | | |
|---|---|---|---|
| 8,280,364 B1 * | 10/2012 | Sennett et al. | ................. 455/419 |
| 8,515,413 B1 * | 8/2013 | Schilit et al. | .................. 455/419 |
| 2007/0113090 A1 | 5/2007 | Villela | |
| 2009/0181662 A1 * | 7/2009 | Fleischman et al. | .......... 455/419 |
| 2011/0009107 A1 | 1/2011 | Guba et al. | |
| 2011/0131325 A1 | 6/2011 | Piccionelli et al. | |
| 2011/0213628 A1 | 9/2011 | Peak et al. | |
| 2012/0214472 A1 | 8/2012 | Tadayon et al. | |
| 2012/0289217 A1 | 11/2012 | Riemer et al. | |
| 2012/0302204 A1 * | 11/2012 | Gupta et al. | .................. 455/406 |
| 2013/0035063 A1 | 2/2013 | Fisk et al. | |
| 2013/0078979 A1 | 3/2013 | Bell et al. | |

OTHER PUBLICATIONS

PCT International Search Report and Written Opinion (PCT/US02014/037570), dated Oct. 14, 2014.

* cited by examiner

*Primary Examiner* — Nghi H Ly
(74) *Attorney, Agent, or Firm* — Douglas W. Rommelmann; Andrews Kurth LLP

(57) ABSTRACT

An embodiment of the present invention includes a method and system for providing a user of a mobile device with a set of applicable legal, company policies or safety information based on the global positioning system (GPS) position of the mobile device and a set of predefined policies. The mobile device may be any of several devices including, but not limited to, a cell phone, tablet, or other electronic device. The provided set of applicable legal, company policies or safety information can comprise various information including, but not limited to, restrictions on the use of a cell phone, potential fines for cell phone use, potential dangers, personal protective equipment requirements, prohibitions, guidelines and the like.

14 Claims, 13 Drawing Sheets

SafeCell Consumer System Configuration

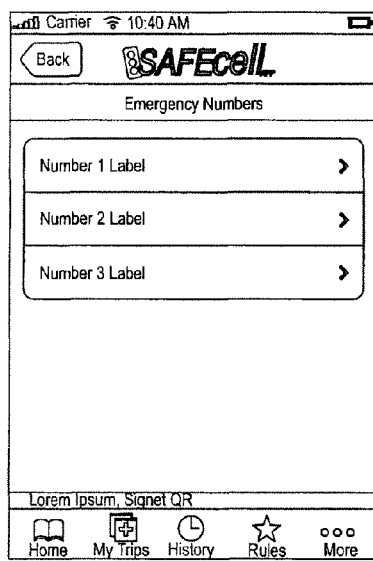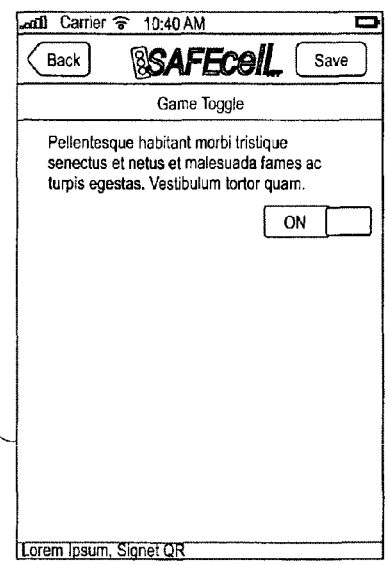
FIG. 8
FIG. 9

SAFECELL 360™ WIRELESS POLICY ENFORCEMENT MANAGEMENT (WPEM) SOLUTION

This application claims priority to U.S. Provisional Application No. 61/821,562, filed May 9, 2013. Applicant incorporates by reference herein U.S. Provisional Application No. 61/821,562 in its entirety.

BACKGROUND OF THE INVENTION

1. Field of the Invention

The invention generally relates to providing an effective wireless policy enforcement management (WPEM) solution and system for use with mobile devices.

2. Description of the Related Art

Recent media reports highlight the rise in catastrophic accidents that are caused by distraction and reduced reaction time due to consumer texting while driving. The percentage of young drivers texting or using other hand-held electronic devices has increased from 2007, according to the National Highway Traffic Safety Administration's 2008 nationwide survey. According to the survey, at any given moment during daylight hours, approximately 812,000 vehicles are being driven by someone using a hand-held cell phone, and in 16% of all fatal traffic fatalities, driver distraction was a factor.

Each day in the United States, more than 9 people are killed and more than 1,060 people are injured in crashes that are reported to involve a distracted driver. Distracted driving is driving while doing another activity that takes your attention away from driving. Distracted driving increases the chance of a motor vehicle crash.

There are three main types of distraction:
Visual: taking your eyes off the road;
Manual: taking your hands off the wheel; and
Cognitive: taking your mind off what you are doing.

Distracted driving activities include things like using a cell phone, texting, browsing the Internet, auto entertainment system interactions, tablet and laptop interactions. Using in-vehicle technologies (such as navigation systems) can also be sources of distraction. While any of these distractions can endanger the driver and others, texting while driving is especially dangerous because it combines all three types of distraction.

In 2011, 3,331 people were killed in crashes involving a distracted driver, compared to 3,267 in 2010. An additional 387,000 people were injured in motor vehicle crashes involving a distracted driver in 2011, compared to 416,000 people injured in 2010.

In 2010, nearly one in five crashes (18%) in which someone was injured involved distracted driving.

In June 2011, more than 196 billion text messages were sent or received in the United States, up nearly 50% from June 2009.

A CDC study conducted by the Centers for Disease Control and Prevention, 1600 Clifton Rd. Atlanta, Ga. 30333, analyzed 2011 data on distracted driving, including talking, texting, and reading email behind the wheel. The researchers compared the prevalence of talking on a cell phone or texting while driving in the United States and seven European countries: Belgium, France, Germany, the Netherlands, Portugal, Spain, and the United Kingdom. Key findings included the following:

Cell phone use while driving

69% of drivers in the United States ages 18-64 reported that they had talked on their cell phone while driving within the 30 days before they were surveyed.

In Europe, this percentage ranged from 21% in the United Kingdom to 59% in Portugal.

Texting or emailing while driving

31% of U.S. drivers ages 18-64 reported that they had read or sent text messages or email messages while driving at least once within the 30 days before they were surveyed.

In Europe, this percentage ranged from 15% in Spain to 31% in Portugal.

What are the risk factors?

Some activities—such as texting—take the driver's attention away from driving more frequently and for longer periods than other distractions.

Younger, inexperienced drivers under the age of 20 may be at increased risk; they have the highest proportion of distraction-related fatal crashes.

What is being done?

Many states are enacting laws—such as banning texting while driving, or using graduated driver licensing systems for teen drivers—to help raise awareness about the dangers of distracted driving and to keep it from occurring. However, the effectiveness of cell phone and texting laws on decreasing distracted driving-related crashes requires further study.

On Sep. 30, 2009, President Obama issued an executive order prohibiting federal employees from texting while driving on government business or with government equipment.

On Oct. 27, 2010, the Federal Motor Carrier Safety Administration enacted a ban that prohibits commercial vehicle drivers from texting while driving.

In response to this ever growing danger, many states and municipalities have passed laws to prohibit or limit the use of cell phones while driving in designated areas, such as schools, creating a patchwork approach to safeguarding students and other pedestrians at critical times and places in various communities.

For example, a number of states have outlawed handheld cell phone use while driving, or have banned cell phone use for certain types of drivers. Most make an exception for emergency calls to police, the fire department, medical personnel, and the like.

At least five states, California, Connecticut, New Jersey, New York, and Washington have enacted laws banning the use of handheld cell phones while driving. With the exception of Washington, these states allow "primary enforcement of an offense" which means that police officers can pull one over for using a handheld cell phone without any other reason for the traffic stop.

Seventeen states and the District of Columbia have enacted special cell phone driving laws for novice drivers, for example, those with a learner's permit, or young drivers, such as those under the age of 18. For example, in California, drivers under the age of 18 cannot use any type of communication device while driving. States with these types of restrictions include: California, Colorado, Connecticut, Delaware, Illinois, Maine, Maryland, Minnesota, Nebraska, New Jersey, North Carolina, Oregon, Rhode Island, Tennessee, Texas, Virginia, Washington D.C., and West Virginia.

Fifteen states plus the District of Columbia have also banned school bus drivers from using cell phones while passengers are present.

Two states, Washington and New Jersey, have banned text messaging for all drivers. Some states, including Utah and New Hampshire, lump cell phone use into a larger ban on distracted driving. For example, in Utah, speaking on a cell phone may be a violation if the driver has committed another moving offense.

In addition to state-wide prohibitions, many towns and cities have banned certain types of cell phone use while driving. Finally, the prohibitions of cell phone use while driving is not limited to the United States. The list of foreign countries that have some sort of cell phone ban for drivers is significant. Most of these countries ban handheld cell phones, not hands-free devices.

Additionally, given the ever-changing patchwork of municipal ordinances and state laws that address cell phone usage, it is difficult for a user to know what legal consequences might result from his or her actions. None of the present applications notify the user of the particular ordinances, regulations, or laws that are in effect in a particular location at a particular time. It is desirable to inform the user of the legal consequences for using a cell phone in a particular area, and with positive reinforcements for safe behavior, allowing the user to exercise his or her sound discretion in determining whether or not to use a cell phone in a particular situation.

An object of an embodiment of the invention is to provide a method and system that will apply pre-defined policies directly to the mobile device automatically at the device's Operating System level and overriding the existing device's policy configuration file and temporarily applying the Safe-Cell 360™ Wireless Policy Configuration file.

An object of another embodiment of the invention is to provide a method and system that effectively deters unsafe practices of mobile device use during driving while enforcing wireless policies across a wide array of device profiles.

An object of an embodiment of the invention is to provide a method and system that utilizes a metrics program to encourage safe cell phone practice and adherence to laws.

An object of an embodiment of the invention is to provide a method and system for deterring unsafe cell phone practices that is cost effective.

An object of an embodiment of the invention is to provide a method and system that automatically informs the user of local laws and policies when the user enters facilities, neighborhoods, cities, counties, or states where cell phone usage prohibitions have been enacted, thus alerting the user of the potential legal consequences of driving while using a mobile communications device.

An object of an embodiment of the invention is to provide a method and system that automatically informs the user of potential hazards or specific requirements when the user enters defined areas such as confined spaces, refineries, manufacturing plants, ships, facilities, tank farms, petrochemical and military installations, thus alerting the user of the potential dangerous consequences while working or entering into these areas.

An object of an embodiment of the invention is to provide a method and system including a web-based application to track a user's position, monitor safe driving, and inform the user when entering defined areas that have specific safety requirements.

Another object of an embodiment of the invention is to provide a method and system for documenting the user's driving habits, providing a 360° view of the user trip by capturing any and all sensory data elements from the device and the SafeCell 360 application installed on the user's device and providing a singular view of all the captured data points. Such information could then be used by insurance companies or risk analysts in determining policy limits for various types of insurances.

The objects described above and other advantages and features of embodiments of the invention are incorporated in a method and system that provides positive, behavior-modifying reinforcement for deterring unsafe behaviors, including unsafe cell phone use, Internet use, email, device-based applications, and in particular, text messaging ("texting"), while driving. In addition, other safety-related information, such as personal protective equipment requirements, prohibitions, or other pre-defined guidelines, may be provided to the user based on the user's location.

BRIEF SUMMARY OF THE INVENTION

An embodiment of the present invention includes a method and system for providing a user of a mobile device with a set of applicable legal, company policies or safety information based on the global positioning system (GPS) position of the mobile device and a set of predefined policies. The mobile device may be any of several devices including, but not limited to, a cell phone, tablet, or other electronic device. The provided set of applicable legal, company policies or safety information can comprise various information including, but not limited to, restrictions on the use of a cell phone, potential fines for cell phone use, potential dangers, personal protective equipment requirements, prohibitions, guidelines and the like.

A metrics aspect may be incorporated as a method of incentivizing drivers to utilize the application by providing reward points for uses of the cell phone in a safe manner and consistent with applicable laws and or individual policies. Percentage of adherence to applicable laws and or individual policies may be used as a basis for recognizing the user's adherence for following such laws and policies.

One embodiment comprises a method of wireless policy enforcement management of a mobile device having one or more wireless communication capabilities from the group consisting of data services and voice services. The method includes providing a software application for execution by the mobile device and pre-defining a first set of specific capabilities the mobile device will be able to run during a non-transit setting and pre-defining a second set of specific capabilities the mobile device will be able to run during an in-transit setting and storing such second set on a remote server as the mobile policy file. A start trip speed is pre-defined in the software application. Sensory data from the mobile device is received and processed to determine when the mobile device meets or exceeds the pre-defined start trip speed. A signal is sent to the remote server upon the mobile device meeting or exceeding the pre-defined start trip speed and the remote server pushes the mobile policy file to the mobile device and temporarily overwrites the non-transit setting. The user's interactions with the mobile device are monitored while in the in-transit setting.

BRIEF DESCRIPTION OF THE DRAWINGS

A better understanding of the present invention can be obtained when the following detailed description of the disclosed embodiments is considered in conjunction with the following drawings, in which:

FIG. 8 is a view of an exemplary client mobile device emergency number screen, showing three preprogrammed emergency numbers that may be rapidly accessed with one-button control;

FIG. 9 is a view of an exemplary client mobile device game toggle screen, showing a button that allows the user to enable or disable game play features of the SafeCell application;

DESCRIPTION OF PREFERRED EMBODIMENTS OF THE INVENTION

Figure 1:
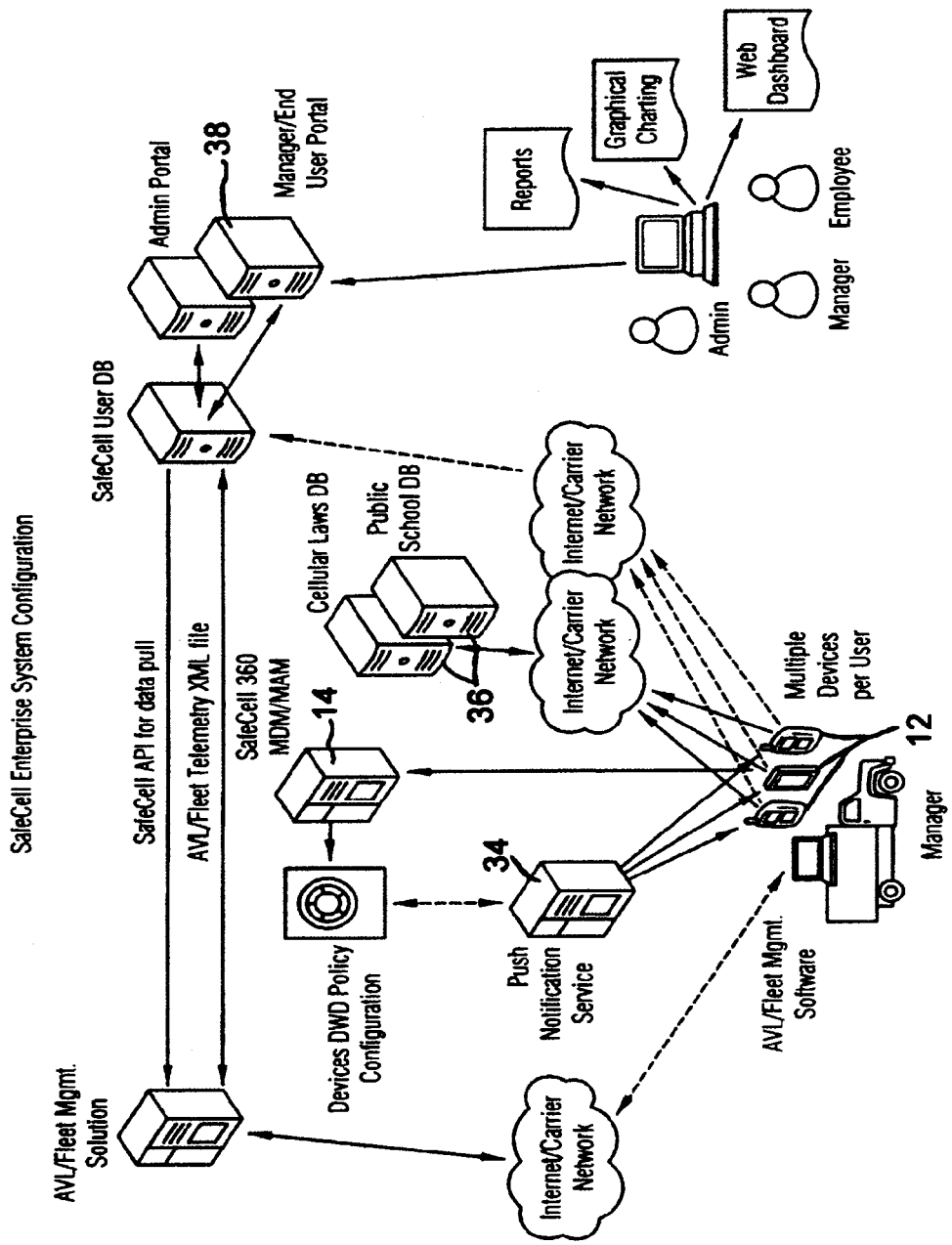
FIG. 1 illustrates a preferred embodiment of the invention showing a SafeCell 360™ WPEM system configuration for AVL/fleet management solutions.
Figure 2:
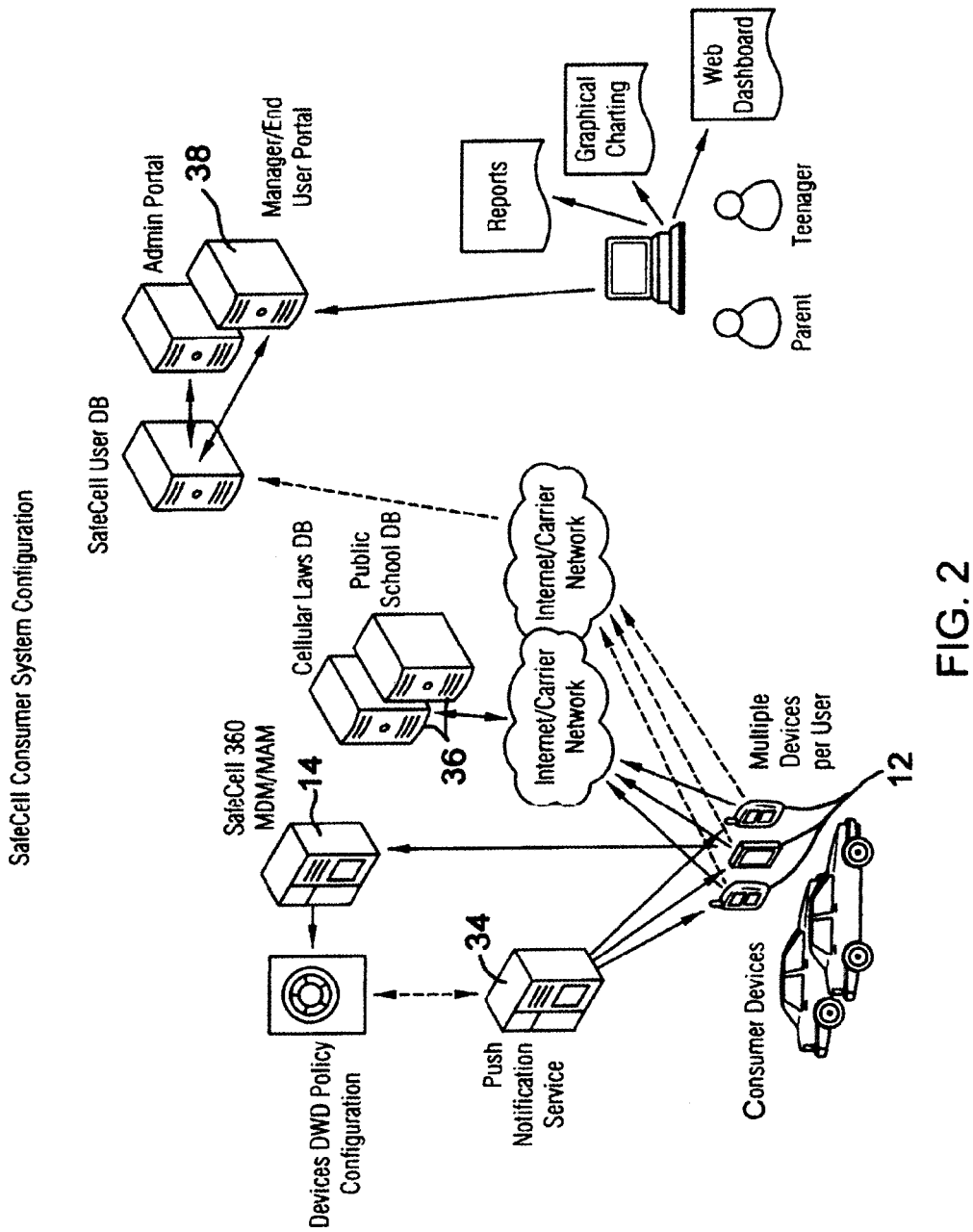
FIG. 2 illustrates a preferred embodiment of the invention showing a SafeCell 360™ WPEM system configuration for consumers, including parents with teenagers

The preferred embodiments of the present invention will now be described with reference to the drawings. FIGS. 1 and 2 illustrate preferred embodiments of the SafeCell 360™ WPEM System Configuration. FIG. 1 is directed to a system configuration for AVL/Fleet Management Solution (the "SafeCell Enterprise System Configuration") providing means for automatically determining and transmitting the geographic location of a one or more vehicles. The system collects data which provides details of each vehicle's travel. FIG. 2 is directed to a system configuration for a consumer with one or more teenagers (the "SafeCell Consumer System Configuration"). The systems illustrated in FIGS. 1 and 2 will be referenced throughout the following discussion.

In a preferred embodiment, the invention is embodied in at least one SafeCell 360™ software application ("SafeCell 360™ app") in combination with a hand held device, cell phone, smart phone (such as an iPhone®, Android® device or personal GPS unit), personal digital assistant ("PDA") (such as a Palm Pilot® or Blackberry® device), tablet computer (such as the Motorola Galaxy®, iPad®, or Microsoft® Surface type devices), navigation/entertainment systems designed into motor vehicles hereinafter simply referred to as a mobile device, and a SafeCell 360™ WPEM server 14 that communicates with the SafeCell 360™ app.

The preferred embodiment of the SafeCell 360™ Wireless Policy Enforcement Management (WPEM) system provides companies, parents and end users with an end to end solution for applying pre-defined policies to an enrolled mobile device, referred to as a client mobile device, based on the client mobile device being in motion or not in motion. The SafeCell 360™ WPEM system is designed to have users enroll selected devices into the solution. When the users enroll the mobile device(s), the users have the ability to pre-define what capabilities will be allowed to run on the device and when. This is referred to as the User Pre-Defined Policy. In a preferred embodiment, the system will allow for users to define the following examples of features, but not limited to:

1) applications that may be installed by the user, what types if allowed, block certain applications from running on the mobile device, limits for use of certain applications (for example, limits on hours of service ("HOS") such as 7 am-7 pm, weekdays, weekends, etc.);

2) what services provided by the mobile device operating system ("OS") are accessible such as phone, email, sms/mms services, Wi-Fi connection, data services, internet, web browsers, camera, and settings, etc.;

3) the SafeCell 360™ WPEM system may allow for users to selectively decide the content ratings allowed to be downloaded to the devices; and 4) access to application and music stores for purchase and downloading of content such as ITunes®, The App Store®, Google Play® and others.

The examples of policies pre-defined above by the users will be applied by the SafeCell 360™ WPEM system on behalf of the users as described below.

Mobile Device Enrollment in the SafeCell 360™ WPEM Server

Once the SafeCell 360™ WPEM server 14 and network are configured, the first step in managing a mobile device is to enroll it with the SafeCell 360™ WPEM server 14. This creates a relationship between the enrolled mobile device and the SafeCell 360™ WPEM server 14, allowing the enrolled mobile device to be managed on demand without further user interaction. The enrollment of the mobile device can be done by connecting the mobile device to a computer via USB, but the preferred solution is to deliver the enrollment profile wirelessly.

SafeCell 360™ WPEM Server Enrollment Process Overview

The process of Over-the-Air Enrollment involves phases that are combined in an automated workflow to provide the most scalable way to securely enroll mobile devices for the enterprise or consumer segments. These phases include:

1. User Authentication

User authentication ensures that incoming enrollment requests are from authorized users and that the user's mobile device information is captured prior to proceeding with certificate enrollment. SafeCell 360™ WPEM server administrators can prompt the user to begin the process of enrollment via a web portal, email, SMS message, or even an app. In one embodiment, the user may be authenticated by a code that is included in either the enrollment email or text that the user is required to input at the time of enrolling.

2. Certificate Enrollment

After the user is authenticated, a certificate enrollment request using the Simple Certificate Enrollment Protocol ("SCEP") occurs. This enrollment request communicates directly to the enterprise Certificate Authority ("CA"), and enables the mobile device to receive the identity certificate of the server from the CA in response.

3. Device Configuration

Once an identity certificate is installed, the mobile device can receive the encrypted wireless policy profile configuration information over the air. This information can only be installed on the mobile device it is intended for and contains the settings needed to connect to the SafeCell 360™ WPEM server 14.

At the end of the enrollment process, the user may be presented with an installation screen that describes what access rights the SafeCell 360™ WPEM server 14 will have on the mobile device. By agreeing to the profile installation, the user's mobile device is automatically enrolled without further interaction.

Once the mobile devices are enrolled as managed devices, they can be dynamically configured with Wireless Policy settings by the SafeCell 360™ WPEM server 14.

Managing Mobile and Tablet Devices

Management of client mobile devices 12 takes place via a connection to the SafeCell 360™ WPEM server 14. This server 14 can be hosted by an IT third-party solution provider or in-house. The client mobile devices 12 communicate with the server 14 to see if there are tasks pending and responds with the appropriate actions. These tasks can include check-in, updating mobile policies, providing requested device or network information, or removing settings and data.

In the preferred embodiment, most management functions are completed behind the scenes with no user interaction required. For example, if the company or individual changes its wireless policy for mobile device use while driving, the SafeCell 360™ WPEM server 14 can configure the client mobile devices 12 with the new Wireless Policy Configuration Profile over the air. The next time that the SafeCell 360™ client application is engaged, the appropriate Wireless Policy Configuration Profile will be applied to the client mobile device 12.

Preferably, when the SafeCell 360™ WPEM server 14 wants to communicate with the client mobile device 12, a silent notification is sent to the client mobile device 12 via a notification server 34 (see FIGS. 1 and 2), for example a push notification service. The server 14 may want the client mobile device 12 to check in with the server 14. The notification server 34 prompts the client mobile device 12 to check in with the SafeCell 360™ WPEM server 14. The client mobile device 12 sends a ping to the server 34. In one embodiment, the client mobile device sends its latitude and longitude coordinates indicating its current location. In the preferred embodiment, the server 14 pushes the Wireless Policy Configuration Profile to the client mobile device 12 via the push notification server 34. The process of notifying the client mobile device 12 will not send any proprietary information to or from the notification service 34. Preferably, all configuration information, settings, and queries are sent from the SafeCell 360™ WPEM server 14 to the client mobile devices 12 over encrypted SSL/TLS connections between the client mobile device 12 and the SafeCell 360™ WPEM server 14. The operating system of the client mobile device 12 handles all SafeCell 360™ WPEM server 14 requests and actions in the background to limit the impact on the user experience, including battery life, performance, and reliability.

In order for the notification server 34 to recognize commands from the SafeCell 360™ WPEM server 14, preferably, a certificate is first installed on the SafeCell 360™ WPEM server 14. This certificate must be requested by SafeCell 360™ WPEM from the OS manufacturer (for example, Apple and Google) and downloaded. The certificate authorizes SafeCell 360™ WPEM to push policy configuration files to enrolled devices. Once the OS manufacturer's notification certificate is uploaded into the SafeCell 360™ WPEM server 14, devices can begin to be enrolled.

SafeCell 360™ WPEM Server Management

There are a number of functions the SafeCell 360™ WPEM server 14 can perform on client mobile devices 12. These tasks include installing and removing configuration and provisioning profiles, managing apps, Wireless Policy Configuration Profile, and ending the relationship with the SafeCell 360™ WPEM server 14.

In one embodiment, during the initial process of configuring a mobile device, the SafeCell 360™ WPEM server 14 pushes the Wireless Policy Configuration Profile to the client mobile device 12. The Wireless Policy Configuration Profile is installed behind the scenes on the client mobile device 12. Over time, the Wireless Policy Configuration Profile settings may need to be updated or changed. To make these changes, the SafeCell 360™ WPEM server 14 can apply a new Wireless Policy Configuration Profile dynamically at any time. Additionally, context-specific configurations may need to be installed on the client mobile device 12, depending on a user's location or role in the organization. As an example, if a user is traveling internationally, the SafeCell 360™ WPEM server 14 can push to the client mobile device 12 a new Wireless Policy Configuration Profile based on the countries the user would be traveling through.

SafeCell 360™ WPEM Server Managed Apps

The SafeCell 360™ WPEM server 14 can manage third-party apps from the OS manufacturers' Apps Stores, as well as enterprise in-house applications. The SafeCell 360™ WPEM server 14 can remove managed apps and their associated data on demand or specify whether the apps are removed when the SafeCell 360™ WPEM server profile is removed.

To install the SafeCell 360™ app, the SafeCell 360™ WPEM server 14 sends an installation command to the user's mobile device. SafeCell 360™ WPEM server managed apps require corporate approval or an individual's acceptance before they are installed. When the corporate IT/individual requests the installation of a managed app from the SafeCell 360™ WPEM server 14, the app will be installed.

Supervised Devices with SafeCell 360™ WPEM Server

Enrolled devices 12 that are activated using SafeCell 360™ WPEM server 14 can be "supervised," enabling additional settings and restrictions to be installed, such as data services, Wi-Fi connections, VPN's, email programs, GPS, settings control, etc. Once a client mobile device 12 is supervised with SafeCell 360™ WPEM server 14, all wireless policy settings and restrictions can be installed over the air via SafeCell 360™ WPEM server 14 as well.

Removing Devices from SafeCell 360™ WPEM Server

A SafeCell 360™ WPEM server administrator can end the SafeCell 360™ WPEM server 14 relationship with a client mobile device 12 by removing the configuration profile that contains the SafeCell 360™ WPEM server information. In doing so, all the accounts, settings, and apps it was responsible for applying the wireless policies for are removed. Alternatively, one may leave the SafeCell 360™ WPEM server Configuration Profile in place and use SafeCell 360™ WPEM server 14 only to remove the specific Wireless Policy Configuration Profiles, Provisioning Profiles, and SafeCell solution apps they want to delete. This approach keeps the device managed by SafeCell 360™ WPEM server 14 and eliminates the need to re-enroll once the device has been redeployed.

Both methods give SafeCell 360™ WPEM server 14 the ability to ensure information is only available to compliant users and mobile devices, and ensures corporate/individual data is removed without interfering with a user's personal data such as music, photos, or personal apps.

The policies defined by the users will be applied by the SafeCell 360™ WPEM system based on when the enrolled device(s) are in motion or not in motion. Throughout the application, in motion is also referred to as "in-transit", and not in motion is also referred to as non-transit or non-motion. The SafeCell 360™ WPEM system has the ability to determine when the enrolled devices are in motion by GPS or other means of determining location and speed. Most modern mobile devices include an onboard GPS receiver, which can provide position, velocity, altitude, and directional information.

The SafeCell 360™ application receives and processes input from the mobile device's GPS receiver or other hardware/software sensor data and uses the GPS position and velocity information to initiate a ping to the SafeCell 360™ WPEM server 14 indicating that the client mobile device 12 has reached a pre-configured trip start speed. When the SafeCell 360™ WPEM server 14 receives the notification, the WPEM server 14 will send to the client mobile device 12 a Mobile Policy Configuration file implementing the client mobile device policies while in motion. In other words, once the SafeCell 360™ WPEM system has determined that the enrolled device 12 is in motion equal to or in excess of the pre-configured start trip speed, the SafeCell 360™ WPEM system pushes a user's pre-defined Mobile Policy Configuration file to the enrolled device 12. The Mobile Policy Configuration file will temporarily overwrite the existing User Pre-Defined Policy for non-motion settings (i.e., settings when the enrolled device 12 is either not in motion or in motion less than the pre-configured start trip speed).

In one embodiment, the User Pre-Defined Policy and the Mobile Policy Configuration files are stored on the client mobile device 12. When the SafeCell 360™ application determines that the client mobile device 12 has reached the pre-configured trip start speed, the Mobile Policy Configuration file overrides the existing User Pre-Defined Policy.

Preferably, the SafeCell 360™ WPEM server 14 has the ability to set the Mobile Policy Configurations at several different levels: Global for the entire company, Group and individual levels.

In a preferred embodiment, the SafeCell 360™ client application logs all details about a user's trips. This trip information may be compiled by the SafeCell 360 application, hardware and software sensors within the device or via Bluetooth connection with the vehicle's onboard computer. For mobile devices that include hardware and software sensors such as an accelerometer, accelerometer input may also be received and processed by the SafeCell 360™ client application. The SafeCell 360™ client application will gather all hardware and software sensory data including all GPS, accelerometer, and hardware unique data elements during the duration of the trip. The following section provides a more complete discussion regarding the sensor types supported by the Android® platform, as an example, that can provide sensory data to the SafeCell 360™ client application.

SafeCell Enterprise Android Sensors Integration

The Android sensor framework allows the SafeCell Enterprise application to provide the most comprehensive driver trip data on the market. These sensors are hardware-based and some are software-based. The hardware-based sensors are physical components built into the different handsets and tablet devices. They derive their data by directly measuring specific environmental properties, such as acceleration, geomagnetic field strength, or angular change. The software-based sensors are not physical devices, although they mimic hardware-based sensors. These software-based sensors derive their data from one or more of the hardware-based sensors and are sometimes called virtual sensors or synthetic sensors. The linear acceleration sensor and the gravity sensor are examples of software-based sensors. Table 1 below summarizes the sensors that are supported by the Android platform.

TABLE 1

Sensor types supported by the Android platform.

| Sensor | Type | Description | Common Uses |
|---|---|---|---|
| TYPE_ACCELEROMETER | Hardware | Measures the acceleration force in m/s$^2$ that is applied to a device on all three physical axes (x, y, and z), including the force of gravity. | Motion detection (shake, tilt, etc.). |
| TYPE_AMBIENT_TEMPERATURE | Hardware | Measures the ambient room temperature in degrees Celsius (° C.). See note below. | Monitoring air temperatures. |

TABLE 1-continued

Sensor types supported by the Android platform.

| Sensor | Type | Description | Common Uses |
|---|---|---|---|
| TYPE_GRAVITY | Software or Hardware | Measures the force of gravity in m/s2 that is applied to a device on all three physical axes (x, y, z). | Motion detection (shake, tilt, etc.). |
| TYPE_GYROSCOPE | Hardware | Measures a device's rate of rotation in rad/s around each of the three physical axes (x, y, and z). | Rotation detection (spin, turn, etc.). |
| TYPE_LIGHT | Hardware | Measures the ambient light level (illumination) in lx. | Controlling screen brightness. |
| TYPE_LINEAR_ACCELERATION | Software or Hardware | Measures the acceleration force in m/s2 that is applied to a device on all three physical axes (x, y, and z), excluding the force of gravity. | Monitoring acceleration along a single axis. |
| TYPE_MAGNETIC_FIELD | Hardware | Measures the ambient geomagnetic field for all three physical axes (x, y, z) in μT. | Creating a compass. |
| TYPE_ORIENTATION | Software | Measures degrees of rotation that a device makes around all three physical axes (x, y, z). As of API level 3 you can obtain the inclination matrix and rotation matrix for a device by using the gravity sensor and the geomagnetic field sensor in conjunction with the getRotationMatrix( ) method. | Determining device position. |
| TYPE_PRESSURE | Hardware | Measures the ambient air pressure in hPa or mbar. | Monitoring air pressure changes. |
| TYPE_PROXIMITY | Hardware | Measures the proximity of an object in cm relative to the view screen of a device. This sensor is typically used to determine whether a handset is being held up to a person's ear. | Phone position during a call. |
| TYPE_RELATIVE_HUMIDITY | Hardware | Measures the relative ambient humidity in percent (%). | Monitoring dewpoint, absolute, and relative humidity. |
| TYPE_ROTATION_VECTOR | Software or Hardware | Measures the orientation of a device by providing the three elements of the device's rotation vector. | Motion detection and rotation detection. |
| TYPE_TEMPERATURE | Hardware | Measures the temperature of the device in degrees Celsius (° C.). This sensor implementation varies across devices and this sensor was replaced with the TYPE_AMBIENT_TEMPERATURE sensor in API Level 14 | Monitoring temperatures. |

There are currently only a few Android-powered devices that have every type of sensor. For example, most handset devices and tablets have an accelerometer and a magnetometer, but fewer devices have barometers or thermometers. Also, a device can have more than one sensor of a given type. For example, a device can have two gravity sensors, each one having a different range. The SafeCell Enterprise application will be enhanced with the assumption that ALL sensors are present in the device and capture telemetry for all those that are and null for those that are not.

Upon the SafeCell 360™ application processing inputs and determining that the client mobile device 12 has reached a pre-configured trip start speed and is in the "in-transit" mode, the SafeCell 360™ client application accesses the SafeCell 360™ database(s) 36 (FIGS. 1 and 2) containing all legal safety equipment, standards, processes, prohibitions or other guidelines that are searchable in terms of the locality in which the prohibition applies. The SafeCell 360™ database(s) 36 is preferably in a cloud or a data center. The SafeCell 360™ application, based on the mobile device's location as determined by GPS, displays the applicable legal and safety information, if any, for its location. For example, the SafeCell 360™ application determines if the user's client mobile device 12 is within a known school zone, and if so, the application provides a notification indicating that the user is entering a "No Cell Phone Zone" and displays the corresponding icon and or potential fine(s). Similarly, if the user's client mobile device 12 is located within a known hazardous area, the application provides a notification indicating that the user is entering such an area and displays the required safety equipment, standards, processes, prohibitions and other pre-defined guidelines. The SafeCell 360™ software application installed on the user's enrolled device will track and monitor the user's interactions with the device client 12 logging all attempted policy violations and types.

In the preferred embodiment, the SafeCell 360™ Mobile Policy Configuration file is pushed to the device automatically any time the device is moving at or above the pre-defined Mobile Policy Configuration limit. As shown in FIGS. 1 and 2, the server 14 pushes the Mobile Policy Configuration file identified as Devices DWD (driving while distracted) Policy Configuration. In certain embodiments the Devices DWD Policy Configuration also includes other policy configurations for the client mobile device. Preferably, the SafeCell 360™ application disables text message, email, and device functionality, responding to incoming communications with an automated message to let others know that the user is temporarily unavailable because in transit. The SafeCell 360™ application logs text messages, email, calls, and inherent applications that were accessed while in-transit. Once the SafeCell 360™ application has determined that motion has ceased, text messaging, email, and telephone functions are automatically re-enabled. In the "in-transit" restricted-use mode, the SafeCell 360™ application preferably includes an emergency override capability for 911 and up to three other emergency contact numbers, such as parents, employer, etc. A passenger-use override capability may also be included.

In a preferred embodiment, according to the Mobile Policy Configuration file settings, the restricted "in-transit" mode, which restricts text message, email, telephone call and application functionality when traveling at or above the configured speed, may be suspended at any time by the mobile device user. However, the ability to suspend the restricted "in-transit" mode policies may be limited due to the Mobile Policy Configuration file, if desired. In one embodiment, the SafeCell 360™ application logs when and where its restricted "in-transit" mode is suspended, the particular cell phone usage that occurs during these periods, such as whether text messaging or voice telephone calls are made, what speeds and accelerations occurred during the period, and what legal restrictions were in place at the time. These parameters are logged to a web-based account hosted on the SafeCell 360™ WPEM server 14, which can be accessed and reviewed by parents and employers, for example. Such web-based account may include a customized landing page for the users, if desired.

Once the user has reached his or her end destination, the SafeCell 360™ application will stop the trip, save and upload the trip telemetry to the user's SafeCell 360™ WPEM portal 38 for review. The trip details will then be available for review by the user in an Internet-based "Dashboard" view accessible via any device with access to the Internet. The SafeCell 360™ WPEM system may allow for automated reports to be generated at pre-defined intervals and sent to a pre-defined email or individual(s). The SafeCell 360™ WPEM system may also have the ability to monitor users' accounts to trigger automatic notifications for users that exceed a pre-defined limit of attempted violations within a certain period.

Preferably, the system will provide the ability for a company or parent to identify the GPS location of the enrolled device 12 via a "Check In" feature. The "Check In" will be a configurable capability that will determine the intervals that the client mobile device 12 will check in with the SafeCell 360™ WPEM system. These location updates can then be used to identify where the users are in the event of an emergency or to locate a missing child, employee or parent. The user's GPS location can be plotted on a real time map via an application programming interface ("API") such as Google Maps®. It is to be understood that various embodiments of the invention are contemplated and the various systems can include a variety of features and combinations of features depending on a specific user's needs or desires.

Based on the cell phone usage patterns developed during a user's trips, for example, whether or not text messaging is used or attempted while the client mobile device 12 is in motion or whether the mobile device is used in a "no cell phone" school zone, the system and method according to a preferred embodiment includes a web-based metrics and tracking system, in which points are accumulated by the user for rewarding safe behaviors. Likewise, points may be deducted from a user's point balance for unsafe client mobile device 12 usage (such as suspending the Mobile Policy Configuration file in order to receive or place a call). The reward points may be used to reward the users in a variety of ways, such as in gift cards, vouchers, and the like. The metrics percentages may also be used to promote gaming play between multiple subscribers to the SafeCell 360™ application, in which users can compete against one another to win prizes.

Preferably, as part of the SafeCell 360™ application web-based interface provided to users is the capability to have multiple "cell phone numbers" that are subscribed to on different cell phone carriers added to a primary account. An individual, manager, business, or parent will have the ability to monitor the usage of the mobile device(s) under their account. As part of primary accounts settings is the ability to predefine the time and/or locations that a client mobile device 12 has the ability to send text messages. The account holder can also set predefined geographical areas that the client mobile device 12 should be located. When the monitored client mobile device 12 exits the allowed area, a predefined message may be systematically sent to the primary account holder's designated contact address notifying them.

The SafeCell 360™ application preferably has the ability to display real-time traffic and or weather relevant to a journey based on way points and the user's position. The trip way points may be captured and stored from a previous trip or manually entered or downloaded. An application programming interface displays the traffic or weather information.

SafeCell 360™ WPEM Server Supported Management Commands in a preferred embodiment.

Managed Configuration
Install Configuration Profile
Remove Configuration Profile
Data roaming
Voice roaming (not available on all carriers)
Managed Apps
Install managed app
Remove managed app
List all managed apps
Install Provisioning Profile
Remove Provisioning Profile SafeCell 360™ WPEM Server Configuration To configure a device with accounts, policies, and restrictions, the SafeCell 360™ WPEM server 14 sends files known as Wireless Policy Configuration Profiles to the device that are installed automatically. Examples of configuration Profiles are XML, java, or other operating systems base code structured files that contain settings that permit the device to work with your enterprise systems, including account infatuation, pass code policies, restrictions, and other device settings. When combined with the previously discussed process of enrollment, device configuration provides corporations/individuals with assurance that Wireless Policy Configuration Profiles are enforced, and that their devices are properly configured with established policies.

Wireless Policy Configuration Profiles can be signed and encrypted. As a result the settings cannot be altered or shared with others.

Following is a design overview of a preferred embodiment of the invention.

SafeCell 360™ app is installed to the target mobile device remotely or manually and runs in the background on the client mobile device. When the SafeCell 360™ app determines that the client mobile device is in-transit it will send a ping/signal to the SafeCell 360™ WPEM server 14. In FIGS. 1 and 2, the server 14 is referenced as including mobile device management ("MDM") and mobile application management ("MAM"). The SafeCell 360™ WPEM server 14 looks at the client mobile device profile configuration on the MDM. The SafeCell 360™ WPEM server 14 will apply the profile configuration rules by pushing the in motion profile configuration file to the client mobile device via a Push Notification Service and applying the appropriate limitations to the client mobile device. This functionality is possible by leveraging the different operating system "OS" manufacturers such as Google®, BlackBerry®, Microsoft®, Apple®, available API's within the SafeCell 360™ WPEM server API's to allow for control of the following examples of capabilities, but not limited to:

i. Accounts
   1. Exchange ActiveSync
   2. IMAP/POP Email
   3. Wi-Fi
   4. VPN
   5. LDAP
   6. CardDAV
   7. CalDAV
   8. Subscribed calendars
ii. Pass code policies
   1. Require pass code on client mobile device
   2. Allow simple value
   3. Require alphanumeric value
   4. Minimum pass code length
   5. Minimum number of complex characters
   6. Maximum pass code age
   7. Time before auto-lock
   8. Pass code history
   9. Grace period for client mobile device lock
   10. Maximum number of failed attempts
iii. Security and privacy
   1. Allow diagnostic data to be sent to OS manufacturer
   2. Allow user to accept un-trusted certificates
   3. Force encrypted backups
iv. Supervised only restrictions
   1. Allow iMessage
   2. Allow Game Center
   3. Allow removal of apps
   4. Allow iBookstore
   5. Allow erotica from iBookstore
   6. Enable Siri Profanity Filter
   7. Allow manual install of Configuration Profiles
v. Other settings
   1. Credentials
   2. Web clips
   3. SCEP settings
   4. APN settings
   5. Global HTTP Proxy (Supervised only)
   6. Single App Mode (Supervised only)
vi. Device functionality
   1. Allow installing apps
   2. Allow Siri
   3. Allow Siri while locked
   4. Allow Passbook notifications while locked
   5. Allow use of camera
   6. Allow FaceTime
   7. Allow screen capture
   8. Allow automatic syncing while roaming
   9. Allow syncing of Mail resents
   10. Allow voice dialing
   11. Allow In-App Purchase
   12. Require store password for all purchases
   13. Allow multiplayer gaming
   14. Allow adding Game Center friends
vii. Applications
   1. Allow use of YouTube
   2. Allow use of iTunes Store
   3. Allow use of Safari
   4. Set Safari security preferences
viii. iCloud
   1. Allow backup
   2. Allow document sync and key-value sync
   3. Allow Photo Stream
   4. Allow shared Photo Stream
ix. Content ratings
   1. Allow explicit music and podcasts
   2. Set ratings region
   3. Set allowed content ratings In a preferred embodiment, SafeCell 360™ WPEM server 14 will utilize the tracking and monitoring capabilities of the SafeCell Enterprise solutions with the addition of the following capabilities. SafeCell 360™ WPEM server 14 will be modified to initiate a ping/signal to the portal based on a predefined interval to log its last real time position. This will allow the Enterprise to identify the client mobile device's location in the event that the Enterprise needs to contact the client mobile device 12 via a text message or direct call in the case of an emergency. A Secondary User Interface will plot the location of the client mobile devices 12 based on a predefined list set of GPS grids or plot the single device 12 within Google Maps. The SafeCell 360™ WPEM server 14 will have the ability for the company or parent to initiate a broadcast message in the form of an sms/mms or voice message of the immediate need or emergency to those client mobile devices 12 identified in the grid. The SafeCell 360™ WPEM server 14 will be able to identify those client mobile devices 12 that have received/confirmed the notification for tracking purposes.

Once SafeCell determines that the trip has ended based on the "Stop Trip" configuration, the SafeCell 360™ app will send a ping/signal to the SafeCell 360™ WPEM server 14 indicating that the trip has ended. In one embodiment, the SafeCell 360™ app determines the trip has ended when it detects the client mobile device has been below the predefined start trip speed for two minutes. The SafeCell 360™ WPEM server 14 will remove the in-transit profile configuration rules by pushing the non-motion profile configuration file to the client mobile device 12 via the Push Notification Service 34 and applying non-motion profile configuration to the client mobile device 12. Alternatively, the server 14 removes the in-transit profile configuration rules and the non-motion profile configuration resumes. The SafeCell 360™ app then compresses and uploads the trip details to the SafeCell portal to the user's profile.

In an alternative embodiment, the SafeCell 360 application residing on the client mobile device detects that the device status is in a moving vehicle and allows for the in-transit policy to be implemented.

The various embodiments of the present invention incorporate or may incorporate or may be used with several of the features disclosed in Applicant's U.S. patent application Ser. No. 13/091,977, published as Publ. No. US 2011/0264246. Some of the features in the prior application have been improved and/or modified in the present application. The following discussion describes some of the various features that may be included in or used with certain embodiments of the present invention.

Figure 3:
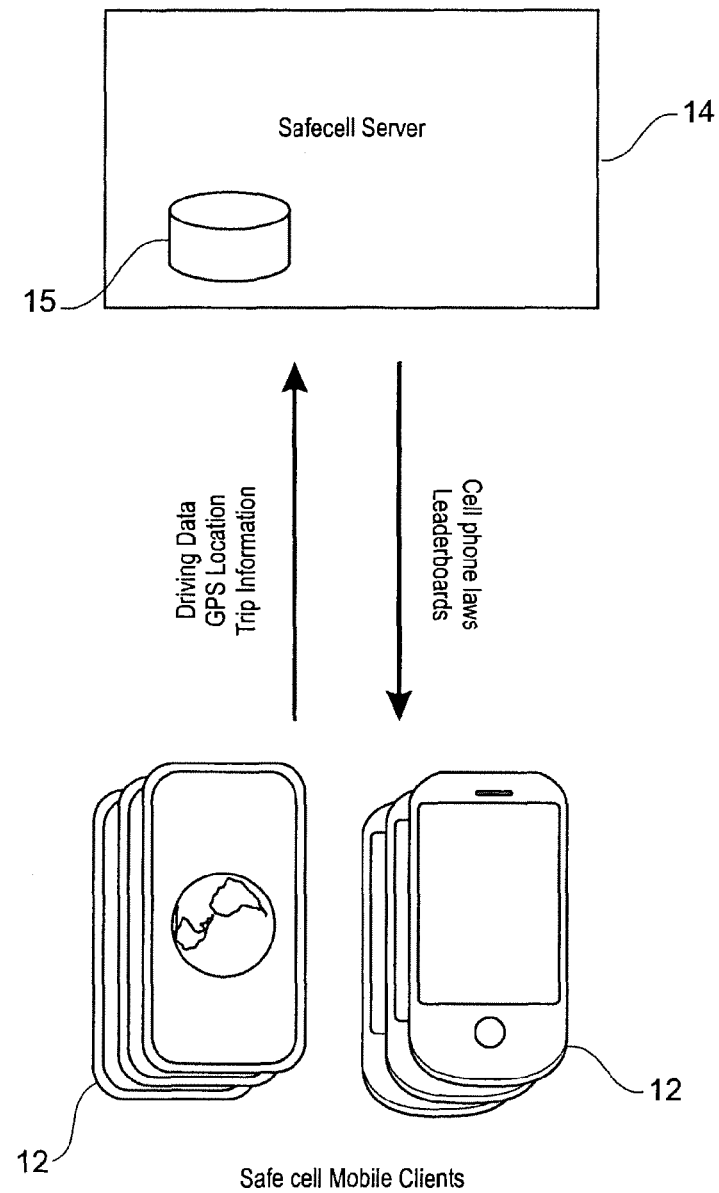
FIG. 3 is a block diagram illustrating interaction and information exchange between a SafeCell application server computer system and an end user mobile device running a SafeCell application.

FIG. 3 illustrates a preferred embodiment of the invention, including a central server computer 14 in communication with the SafeCell 360™ app residing in and executed by the client mobile device. Preferably, numerous client mobile devices 12 (each running the SafeCell 360™ app) are in communication with the SafeCell 360™ WPEM server 14.

The SafeCell 360™ application is preferably downloadable and installable on mobile devices directly from SafeCell 360™ server 14. The SafeCell 360™ application includes step by step instructions for installation and setup, for example.

The SafeCell 360™ app is for use in iPhone, Google Android, Windows, and BlackBerry SDK environments using the OEM development platform or other mobile devices' software development applications. Mobile devices using these SDK's are sophisticated devices that combine the revolutionary multi-touch interface with powerful features, such as email and instant-messaging capability, customer applications and a full-featured browsers. Additionally, the SafeCell 360™ software application is preferably adapted for use with all other smart phones, cell phones, and PDAs having sufficient capability. The SafeCell 360™ app ideally includes the ability to be integrated into each applicable mobile device's operating system ("OS") to allow for the application to be launched automatically at the startup of the device and run in background. Alternatively, if the SafeCell 360™ app is not running in background, one-touch activation of the application is provided.

The SafeCell 360™ WPEM server computer 14 receives and collects data from mobile device SafeCell 360™ client 12, including trip details (location, velocity, heading, altitude, starts, stops, accelerometer, and device hardware sensory data) and mobile device usage details. The SafeCell 360™ server 14 manages family and enterprise account settings, including the calculation of trip metrics. Finally, the SafeCell 360™ server 14 includes multiple device policies, company policy configurations databases 15, from which it provides information to the end users regarding the relevant laws, ordinances, prohibitions, legal, safety equipment, standards, processes, prohibitions and other forms of pre-defined guidelines (hereinafter simply "configuration policy file(s)") for the user based on the location.

Client mobile device 12 preferably employs cellular data connections (including GPRS, EDGE, 3G, 4G, LTE) and includes an onboard Global Positioning System ("GPS") receiver, which can provide position velocity, heading, altitude, starts, and stops information. Assisted GPS, which utilizes cell-tower-triangulation, Wi-Fi hotspot visibility, etc., to supplement GPS, privately owned GP systems maintained by companies may also be used. The SafeCell 360™ application receives and processes input from the mobile device's GPS receiver and uses the GPS position, location, velocity, heading, altitude, starts, and stops information to log details about a user's trips. For mobile devices that include an accelerometer and hardware/device sensors, telemetry from these sensor will also be received and processed by the SafeCell 360™ application.

Client mobile device 12 includes a SafeCell 360™ software application. Upon launch of the application, the system immediately checks to identify whether the phone is in use with a Bluetooth-enabled device. As some of the cell phone restriction rules accommodate cell phone usage with Bluetooth or other appropriate hands-free enabling devices, the SafeCell 360™ application takes the mobile device's present policy configuration file into consideration. If the client mobile device is not presently connected to an appropriate hands-free device but an applicable law allows cell phone use with such device, the SafeCell 360™ application notifies the user so that he or she may enable hand-free devices, if available.

In addition to hands-free use via Bluetooth, the SafeCell client mobile device may provide for hands-free voice control of the various SafeCell 360™ application functions, for example, via the Ford Motor Company SYNC AppLink interface, General Motors OnStar® interface, Garmin® interface, TeleCommunication Systems VS Navigator® as well as other onboard navigation user interfaces. The SYNC AppLink or other listed interfaces allows hands-free voice control or steering wheel button control of popular iPhone®, Android®, or BlackBerry® Smartphone applications. The SafeCell 360™ application is preferably voice activated by the user using various commands, such as "Start SafeCell" for launching the SafeCell 360™ application. The SafeCell 360™ application can also be launched automatically on other devices once the vehicle is in motion at a predefined policy start trip miles per hour threshold. Other commands are also ideally provided. Voice control also preferably includes the use of software-generated audible voice prompts triggered by geographical position. For example, the user may be notified with a voice prompt, "You are now entering a no cell school zone," "Cell phones are now allowed," "Personal Protection Level V is not required," or "Caustic Area—No Entry."

Figure 11:
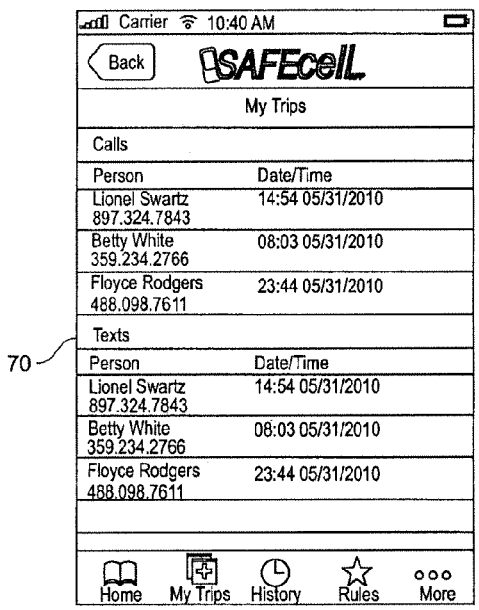
FIG. 11 is a view of an exemplary client mobile device trip history screen in which missed calls or interruptions are logged for the most recent trip.

When the SafeCell 360™ application is enabled, any time vehicle is moving more than the predefined policy start trip, the application disables predefined functions and capabilities such as text message, email, and telephone call functionality, while responding to incoming communications with an automated message (or for example, providing a status of "X" via the native sms/text, Facebook or Twitter) to let those others know that the user is temporarily unavailable because in transit. The SafeCell 360™ application logs all attempts to violate the predefined policy configurations prohibiting the use of sms/text messages, Internet, resident mobile applications, email, and calls that were missed when disabled due to transit, as illustrated in FIG. 11. Once the SafeCell 360™ application has determined that motion has ceased, text messaging, email, and telephone functions are automatically re-enabled. In this "in transit" restricted-use mode, the SafeCell 360™ application includes an emergency override capability for 911 that allows for multiple emergency contact numbers, such as parents, employer, etc. A passenger-use override capability is also included.

The SafeCell 360™ application logs the user's GPS location, speed, altitude, and heading. The SafeCell 360™ application can be enabled to provide other safety information prior to the user entering a predefined area in which protocols have been implemented that require specific safety equipment, standards, processes, prohibitions or other forms of pre-defined guidelines. In the event the user is entering into such an area, the SafeCell 360™ application provides the user with an automated message (for example, "Breathing Equipment Required From This Point On") based on a database that stores geo-specific safety information.

According to the predefined operation settings, the restricted "in transit" mode, which restricts functions and capabilities such as text message, email, and telephone call functionality when traveling at the predefined speed, may be suspended at any time by the mobile device user. However, the ability to suspend the restricted "in transit" mode may be limited due to parental settings, if desired. The SafeCell 360™ application logs when and where its restricted "in transit" mode is suspended, the particular cell phone usage that occurs during these periods, such as whether text messaging or voice telephone calls are made, what speeds and accelerations occurred during the period, and what legal restrictions were in place at the time. These parameters are logged to a web-based account hosted on a SafeCell 360™ WPEM server 14, which can be accessed and reviewed by parents and employers, for example. Such web-based account may include a customized landing page for the users, if desired. Additionally, for enterprise customers, reports may be available for download in Excel or Adobe Acrobat file format for review and auditing of employees' adherence to the company's cell policies.

Based on the cell phone usage patterns developed during a user's trips, for example, whether or not text messaging is used while the phone is in motion or whether the mobile device is used in a "no cell phone" school zone, the system and method according to the preferred embodiment includes a web-based metrics and tracking system, in which points are accumulated by the user for rewarding safe behaviors. Likewise, points may be deducted from a user's point balance for unsafe mobile device usage (such as suspending the SafeCell 360™ application in order to receive or place a call). The safe driving behaviors metrics compiled by the user may be used to acknowledge such positive driving in a variety of ways, such as in gift cards, vouchers, and the like. These safe driving metrics may also be used to promote gaming play between multiple subscribers to the SafeCell 360™ application, in which users can compete against one another to win prizes.

Figure 4A:
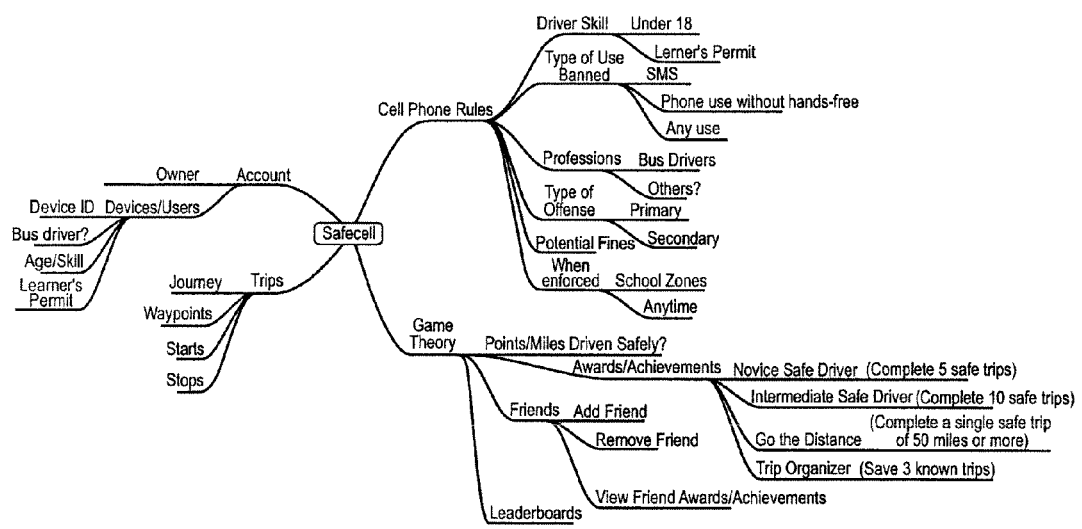
FIG. 4A is a high-level logic flow schematic according to an embodiment of the invention, showing four distinct branches of logic account logic, trip logic, cell phone rule logic, and game theory logic that are provided to a SafeCell application user based on information supplied by the user.

FIG. 4A is a high-level logic flow schematic according to a preferred embodiment of the invention, showing four distinct branches of logic—account logic, trip logic, cell phone rule logic, and trip metrics theory logic—that are provided to a SafeCell 360™ application based on information supplied by the user. The trip metrics theory logic captures the in-transit data showing whether the user adhered to the mobile policy or not. This information is stored in each user's account on the portal. The distinct structure and functioning of each branch of logic is detailed below.

Figure 4B:
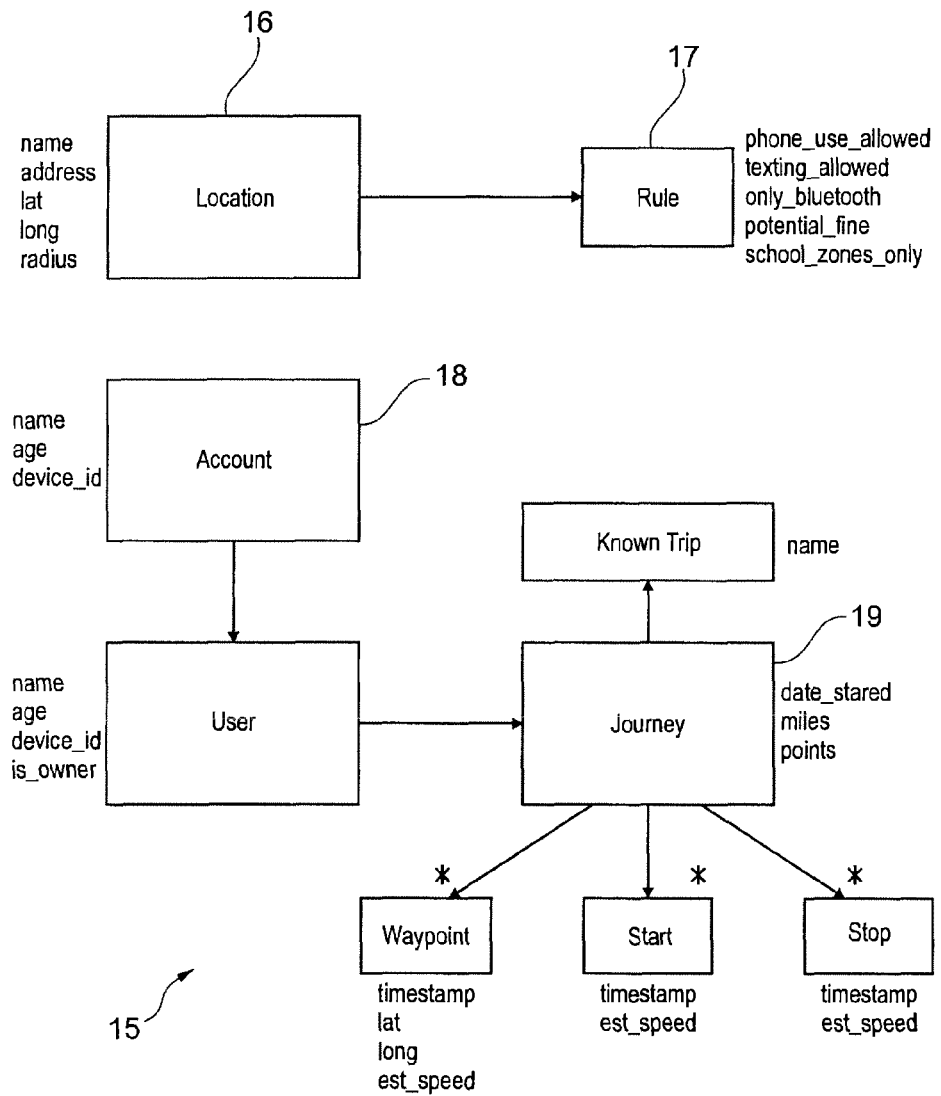
FIG. 4B is a block diagram illustrating a domain or data model for implementing the logic of FIG. 4A according to an embodiment of the invention.

FIG. 4B is a block diagram illustrating a domain or data model of database 15. Location data for all schools, for example, is cataloged at block 16. Federal, state, county and local cell phone restrictions and prohibitions, if any, in the form of statutes, regulations, or ordinances are cataloged at block 17. Together, this data is processed by SafeCell 360™ WPEM server 14 so that applicable cell phone restrictions/laws are pushed to all client mobile devices 12 based on their individual locations in real time. Subscriber account information is stored at block 18, and each user's trip details is stored at block 19.

Figure 5:
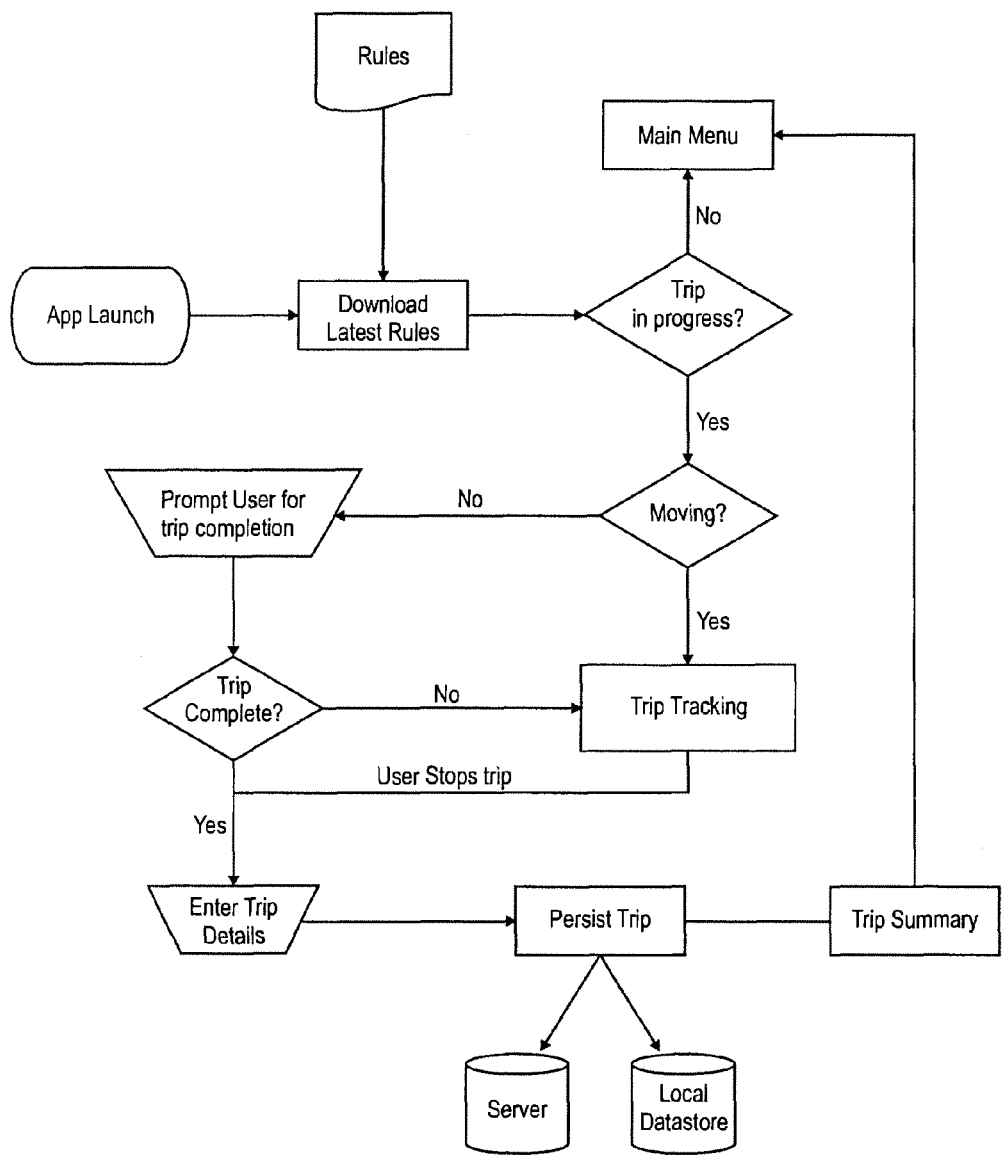
FIG. 5 is a block level flow chart outlining a preferred implementation of the trip logic branch of FIG. 4 wherein the movements of an end user mobile device running a SafeCell application are tracked.

FIG. 5 is a block level flow chart outlining a preferred implementation of the trip logic branch of FIG. 4A wherein the movements of client mobile device 12 are tracked. Its operation is illustrated as follows: A user enters vehicle and launches the SafeCell application to start a new trip, or the SafeCell application starts automatically once the application determines that the device is moving at or more than the predefined miles per hour. The car starts in motion, meanwhile the client mobile device 12 collects data pertaining to accelerometer, hardware/device sensors and GPS activity, current location, and time. The data is used to describe a summary of the trip for later review. Specifically, the SafeCell 360™ application tracks the following data during a trip: such as Current location (based on GPS or Assisted GPS), estimated speed (based on GPS or Assisted GPS averaged over time), date, time, distance traveled, latitude, longitude, and interruptions. Interruptions may be caused by a number of activities, most notably incoming phone calls and text messages. The user may quit the application. The user may also suspend the SafeCell 360™ application to use the phone. When the SafeCell application is resumed, it continues tracking the trip.

Figure 6:
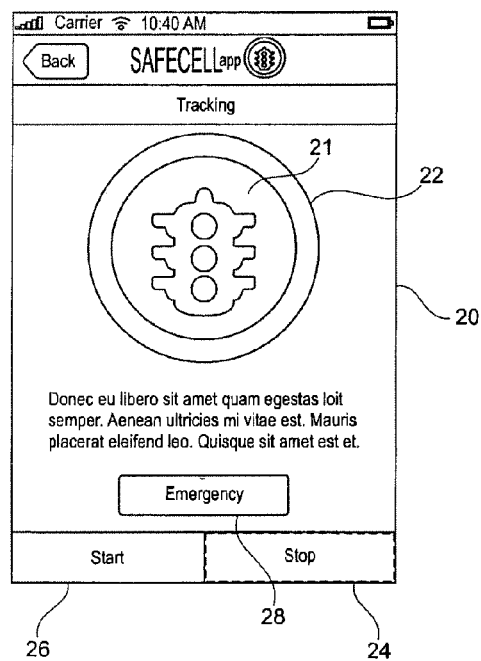
FIG. 6 is a view of an exemplary client mobile device tracking screen, showing an orb icon that provides information about cell phone restrictions.

A tracking screen 20, such as that illustrated in FIG. 6, is visible during a trip. This screen serves as a visual reminder to not use the phone for SMS texting, email, or other activities such as entering a school zone. Additionally, the screen may provide prompts or subtle hints to the user that their current location has strict traffic laws around cell phone usage. For example, tracking screen 20 includes icons 21, 22 that represent the applicable cellular law(s) that are in place based on their real-time GPS location. These icons may include a school house icon for either being within a predefine radius of a school or if there is a specific law for using a cellular device in a school zone, a text messaging bubble icon indicating there is a cellular law in place that prohibits texting, and/or a cell phone icon indicating that there is a cellular law in place that prohibits the use of a mobile device. Each of these icons are in a gray state unless the SafeCell 360™ application identifies that there is an applicable law in place for the user's immediate GPS location. The icons turn red when a cell phone law or ordinance applies. Each change in appearance will be accompanied by an audible prompt of the corresponding law or ordinance indicating that there is a cell phone law in place. The user has the freedom to acknowledge the cell phone restriction notification and disable the texting function, for example, or to discard or disregard the prompt.

Buttons 24, 26 to suspend and resume the SafeCell 360™ application are provided, and an Emergency button 28 to allow emergency calls is provided. Pressing Emergency Button 28 opens Emergency Screen 40, from which 911 or other preprogrammed numbers may be quickly dialed by a single selection.

Figure 7:
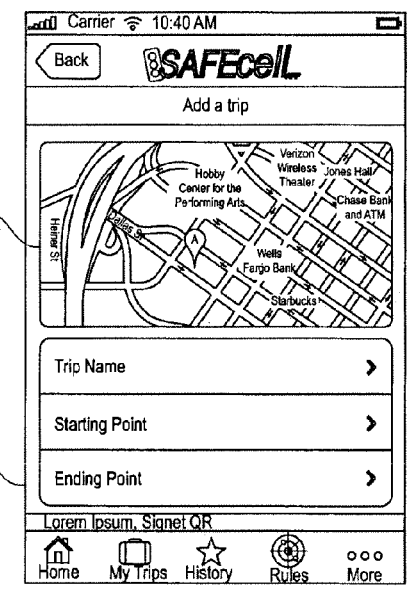
FIG. 7 is a view of an exemplary client mobile device navigation and trip screen, showing a map that provides information about cell phone restrictions as well as navigation assistance that allows a user to plan, name and save completed trips.

FIG. 7 illustrates an additional tracking screen 30, which may be used as a source of navigation information while driving, to plan a trip, or to save a trip after it has been completed, as described below. The navigation information may optionally be imported from a separate software application. Navigation screen 30 preferably includes a moving map 32, and areas of cell phone restriction are indicated as colored shading within map 32.

The SafeCell 360™ application incorporates a metrics aspect as a method of incentivizing drivers to utilize the application. This metrics aspect provides a user with a way to accrue points by using the application and not texting or using their cell phone in locations where cell phone use is prohibited by state or local laws. The SafeCell 360™ application provides users with various metrics on the levels that they have obtained. Once users have achieved predefined percentage of adherence, they may be rewarded for their adherence to policies by: gift cards or similar rewards 50 as illustrated in FIG. 9.

At the end of the trip, the trip is saved automatically to the client mobile device 12 and uploaded to the SafeCell 360™ WPEM server 14. Users earn a positive percentage for long and/or repeated trips on which they safely leave the SafeCell 360™ application running the entire time. Interruptions to the SafeCell application reduce the trip adherence percentages.

Figures 10A, 10B:
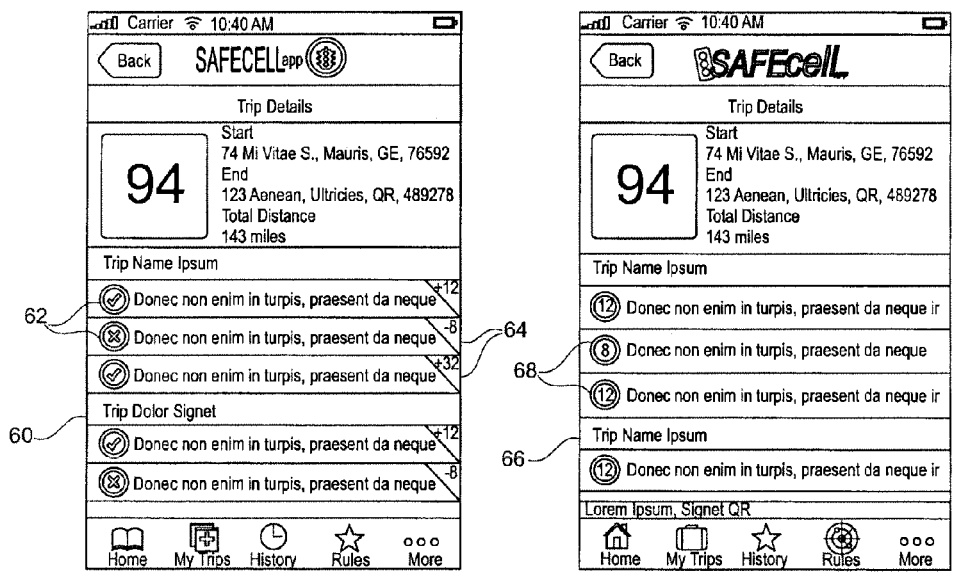
FIG. 10A is a view of an exemplary client mobile device screen, showing information for most recent trips, including status icons indicating adherence or lack of adherence to applicable cell phone laws and gaming points that were rewarded or deducted for those trips.
FIG. 10B is an alternative view of recent trip screen of FIG. 10A in which the adherence icons and gaming points indicia are combined.

FIG. 10A is a view of a client mobile device recent trips screen 60, showing information for most recent trips, including start and end points and the percentage of adherence to policies for the trips. Status icons 62 indicating adherence or lack of adherence to applicable cell phone laws and gaming point indicia 64 that display gaming points rewarded or deducted for those trips are displayed. FIG. 10B is an alternative recent trips screen 66 in which the cell phone rules adherence and gaming points are displayed 68. For example, the number of points for policy adherence may be displayed with a green background, and the number of points deducted from the trip may be displayed with a red background. Recent trips screens 60 and 66 may also provide a brief explanation as to why points were awarded or deducted. FIG. 11 illustrates an optional trips history screen 70 in which interruptions or missed calls and texts during a particular trip are displayed.

Figure 12:
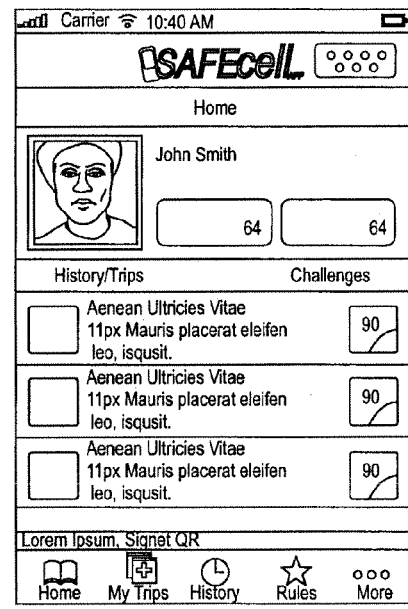
FIG. 12 is a view of an exemplary client mobile device user's home screen, showing a summary of points accrued for the three most recent trips and the user's cumulative gaming score.

FIG. 12 illustrates a user's home page screen 80. Screen 80 shows the user's most recent trips and the score associated with each one of them. Screen 80 also shows the player's overall percentage of adherence to policies utilizing the Safe-Cell 360™ application.

Figure 13:
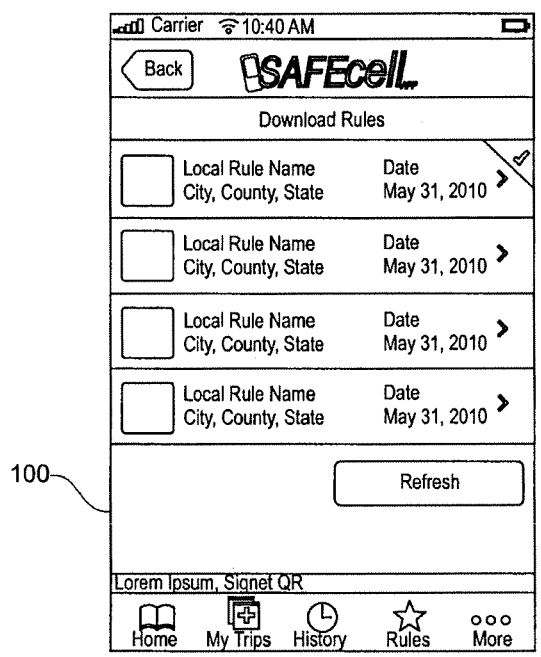
FIG. 13 is a view of an exemplary client mobile device download rules screen, showing various cell phone rules that have been downloaded by the user.

Cell phone usage rules vary by federal, state, county, city, and even within a municipality. The SafeCell 360™ WPEM server 14 will select and download applicable rules for a user's current location, presenting the rules in an easy-to-read format. These applicable rules are updated in real time as the user travels. For example, the SafeCell 360™ application may determine if a client mobile device 12 is located within a known school zone by utilizing a Google Maps application with overlay technology. However, other suitable Geographic Information System ("GIS") technology and methods may be used as appropriate. FIG. 13 illustrates a client mobile device screen 100 in which cell phone rules for particular areas can be selected and manually downloaded for viewing by the user, if desired.

The SafeCell 360™ WPEM system provides for parental or company controls, including the ability for parents or companies to set predefined policies for "in motion" and "non-motion" settings for the application. For example, parents may disable the user's ability to suspend, or interrupt, operation of the SafeCell 360™ application in order to place or receive calls, emails or text messages when in motion. Parents and companies have the ability to preload the SafeCell 360™ application to new or existing phones, and application preferences have the ability to be password protected. Parents and companies have the ability to preload the application with specific times that certain features of the phone are functional. Parents and companies have the ability to preload the application with pre-defined geographical areas that certain features of the mobile device will function along with notification if the mobile device leaves the pre-defined geographical area(s).

Figure 14:
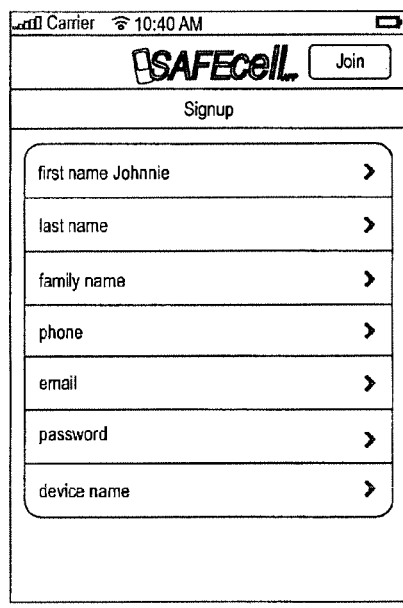
FIG. 14 is a view of an exemplary client mobile device signup screen, showing data fields to be initially populated by a subscriber.

FIG. 14 illustrates a signup screen 110. Signup screen 110 preferably appears after the SafeCell 360™ application has been successfully downloaded to a mobile device. The subscriber inputs appropriate information into each of the fields.

Figure 15:
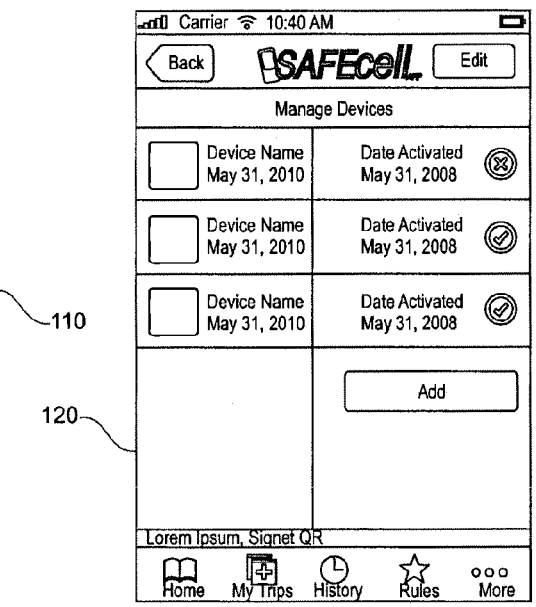
FIG. 15 is a view of an exemplary client mobile device management screen, showing multiple client mobile devices that are associated with a single family account.

FIG. 15 illustrates an account management screen 120, in which multiple client mobile devices 12 can be associated with a family account, for example.

Figures 16, 17:
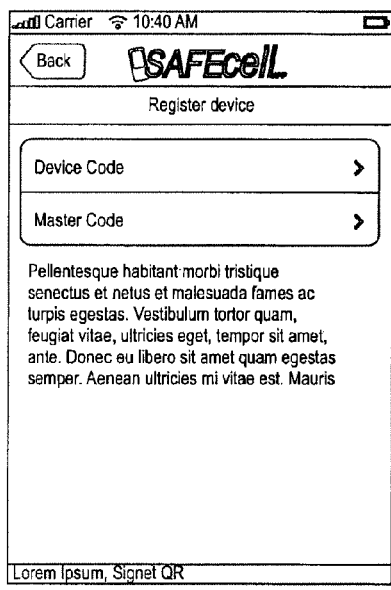
FIG. 16 is a view of an exemplary client mobile device password screen, showing fields for entry of a password to access parental or employer controls and settings.
FIG. 17 is a view of an exemplary client mobile device options screen, showing various icons for accessing various functions available within the SafeCell software application.

FIG. 16 illustrates a password entry screen 130 that may be used in conjunction with parental or company control.

FIG. 17 illustrates an options screen 140 of the SafeCell application software. From options screen 140, the user can update device information by selecting the "Device" icon 141, input personal information for client mobile device 12 by selecting the "Profile" icon 142, manage devices from management screen 120 (FIG. 15) by selecting the "Manage Devices" icon 143, see earned game points by selecting the "Game Play" icon 144, view applicable cell phone rules based on GPS location by selecting the "Rules" icon 145, and program emergency numbers by selecting the "Emergency Numbers" icon 146.

While the invention is described above with reference to a SafeCell client mobile device 12, the SafeCell application may alternatively be preloaded or downloaded directly to a vehicle's memory, hard drive and executed by an onboard computer system, such as an onboard navigation system, or by an aftermarket navigation system such as a TomTom or Garmin GPS system, for example, within the scope of the invention. The SafeCell applications cellular laws at a federal, state, county, and city may be pushed directly to the above devices as additional content for other existing application or integrated into the devices via an application program interface.

Securely registering the user's device with the SafeCell 360 Solution allows the SafeCell 360 Solution to fully scan and document all hardware related information of the client mobile device, all software installed on the device, security settings, all third party software loaded to the device, and all system settings of the device. The preferred embodiment provides a method to configure the policy configuration files to push and install on the device based on, but not limited to, in-motion, non-motion and hours of service. These configuration settings include but are not limited to the hardware settings, applications, network, security, VPN, and device functions.

Features of a preferred embodiment include a process in which the SafeCell 360 WPEM provides authorization to the OEM of the operating systems to access and push policy configuration changes directly to the user devices operating system via the OEM "Push Notification Server(s)" processes; provides communicating with the device via a push notification service to transfer and install the device policy configuration files based on in-motion, non-motion, device hardware configuration(s), security and hours of service files; provides the ability to push and install transparently without user knowledge new or revised device policy configuration file(s) immediately based on device GPS locations within defined facilities or locations; provides a systemic mandatory check-in of the SafeCell 360 Solution on a predefined interval allowing the company or parent the ability to locate user via GPS positioning within a map; provides the ability to communicate with the user device in the event of an emergency; remotely installing the SafeCell 360 app on the user device; provides a process to automatically update the SafeCell 360 app remotely via the SafeCell 360 WPEM server; provides the ability to fully integrate into any existing AVL/Fleet Management solutions providing the ability to integrate mechanical telemetry into the SafeCell 360 telemetry captured by the SafeCell 360 app during the user's trip, and make the integrated data available via the SafeCell 360 WPEM portal; provides a process to apply new hardware configurations to the device remotely based on company or parental changes; and provides a process for identifying applications that are allowed to operate on the device "Whitelist" and those that are not allowed to operate and are banned for operation or loaded to the device "Blacklist."

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein.

I claim:

1. A method of wireless policy enforcement management of a mobile device having one or more wireless communication capabilities from the group consisting of data services and voice services, the method comprising:
   providing a software application for execution by the mobile device;
   pre-defining a first set of specific capabilities the mobile device will be able to run during a non-transit setting;
   pre-defining a second set of specific capabilities the mobile device will be able to run during an in-transit setting and storing such second set on a remote server as the mobile policy file;
   pre-defining a start trip speed in the software application;
   receiving and processing sensory data from the mobile device to determine when the mobile device meets or exceeds the pre-defined start trip speed;
   sending a signal to the remote server upon the mobile device meeting or exceeding the pre-defined start trip speed;
   the remote server pushing the mobile policy file to the mobile device and temporarily overriding the non-transit setting; and
   monitoring the user's interactions with the mobile device while in the in-transit setting.

2. The method of claim 1, further comprising:
   determining when the trip is over;
   uploading the user trip data; and
   removing the mobile policy file and resuming the non-transit setting on the mobile device upon termination of the trip.

3. The method of claim 1, further comprising:
   determining a geographical location of the mobile device; and
   wherein when it is determined that the mobile device initially meets or exceeds the pre-defined start trip speed, the software application accesses a database containing mobile device usage restrictions and guidelines for the geographic location of the mobile device.

4. The method of claim 3, wherein determining the geographical location of the mobile device includes using a Global Positioning System associated with the mobile device.

5. The method of claim 3, wherein the database includes laws regarding cellular use within the geographic location.

6. The method of claim 5, wherein the database includes cellular restrictions relating to schools.

7. The method of claim 3, further comprising:
   determining if the geographical location of the mobile device is within a geographical area of restricted use of the mobile device; and
   restricting use of the mobile device based on the determination of whether the location of the mobile device is within a geographical area of restricted use.

8. The method of claim 7, further comprising not restricting use of the mobile device if the call is indicated to be an emergency call.

9. The method of claim 1, wherein the mobile device is one of a cellular telephone, a personal digital assistant, a pager, a portable computer, and a portable communication device.

10. The method of claim 1, further comprising enrolling the mobile device in the management system.

11. The method of claim 10, further comprising allowing the management system to fully scan and document all hardware related information of the mobile device, all software installed on the mobile device, security settings, all third party software loaded to the mobile device, and all system settings of the mobile device.

12. A method for remotely applying pre-defined policies to a mobile device on the basis of the speed the mobile device is travelling, comprising:
    enrolling the mobile device in the system;
    providing a software application for execution by the mobile device, the mobile device characterized by having one or more wireless communication capabilities from the group consisting of data services and voice services and associated with a navigation component that provides navigation data;
    pre-defining a first set of specific capabilities the mobile device will be able to run during a non-transit setting and storing such first set on a server as the user's non-motion policy file;
    pre-defining a second set of specific capabilities the mobile device will be able to run during an in-transit setting and storing such second set on the server as the user's mobile policy file;
    upon determining the mobile device is travelling at or above a pre-configured start trip speed,
       pushing the user's mobile policy file to the mobile device and temporarily overwriting user's non-motion policy file; and
       monitoring the user's interactions with the mobile device while in the in-transit setting; and
       gathering hardware and software sensory data including GPS, accelerometer, and hardware unique data elements while in the in-transit setting.

13. The method of claim 12, further comprising upon determining a trip is over, the provided software application will upload the user trip data to a remote user's account.

14. The method of claim 13, wherein the user trip data includes all violations, accelerometer and device sensor telemetry.

* * * * *